United States Patent
Dede et al.

(10) Patent No.: US 12,036,612 B2
(45) Date of Patent: Jul. 16, 2024

(54) PERMEABLE SUPPORT INFILL STRUCTURE FOR FUEL CELL FLUID FLOW NETWORKS

(71) Applicant: Toyota Motor Engineering & Manufacturing North America, Inc, Plano, TX (US)

(72) Inventors: Ercan M. Dede, Ann Arbor, MI (US); Yuqing Zhou, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 776 days.

(21) Appl. No.: 17/085,626

(22) Filed: Oct. 30, 2020

(65) Prior Publication Data

US 2022/0140361 A1 May 5, 2022

(51) Int. Cl.
*B22F 3/11* (2006.01)
*B22F 7/00* (2006.01)
*H01M 8/0228* (2016.01)
*H01M 8/0232* (2016.01)
*H01M 8/0258* (2016.01)
*H01M 8/0267* (2016.01)

(52) U.S. Cl.
CPC ............ *B22F 3/1109* (2013.01); *B22F 7/004* (2013.01); *H01M 8/0228* (2013.01); *H01M 8/0232* (2013.01); *H01M 8/0258* (2013.01); *H01M 8/0267* (2013.01); *B22F 2999/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 2,198,042 A | * | 4/1940 | Schlecht | B22F 3/1103 419/30 |
| 6,838,202 B2 | | 1/2005 | Brady et al. | |
| 2002/0114990 A1 | * | 8/2002 | Fly | H01M 8/2418 429/514 |
| 2022/0140359 A1 | * | 5/2022 | Dede | H01M 8/0228 429/437 |
| 2022/0140362 A1 | * | 5/2022 | Zhou | H01M 8/04701 429/434 |

* cited by examiner

*Primary Examiner* — Anca Eoff
(74) *Attorney, Agent, or Firm* — Jordan IP Law, LLC

(57) ABSTRACT

A fuel cell may include a first fuel cell bipolar plate defining an air layer, a second fuel cell bipolar plate defining a hydrogen layer, and a coolant layer defined by the air layer and the hydrogen layer. A permeable support infill structure, composed of sintered thermally conductive powder particles, is arranged at the cooling layer to prevent flow blockage at the coolant layer, define a thermally conductive path between the air layer and the hydrogen layer, and facilitate coolant flow through the permeable support infill structure.

20 Claims, 5 Drawing Sheets

PERMEABLE SUPPORT INFILL STRUCTURE FOR FUEL CELL FLUID FLOW NETWORKS

TECHNICAL FIELD

Embodiments relate generally to a fuel cell (FC), and one or more methods of fabricating an FC.

BACKGROUND

Hydrogen fuel cell (FC) technology has been utilized widely in a variety of stationary and non-stationary applications, e.g., space transport, satellites, motor vehicles, power generation, and electronics. The FC device converts chemical potential energy into electrical energy.

A FC stack generally comprises hundreds of FCs arranged in a stack formation. Each fuel cell comprises a hydrogen layer defined by a hydrogen plate having a plurality of channels for facilitating hydrogen flow into a reaction zone, an air layer defined by an air plate having a plurality of channels for facilitating air flow into the reaction zone, and a coolant layer defined by superposition or stacking of the hydrogen plate on the air plate. The hydrogen plate and the air plate may be fabricated by a stamping process to provide the plurality of channels.

The MEA is as a proton exchange membrane (PEM) cell having sides coated with a catalyst for the hydrogen oxidation (anode) and oxygen reduction (cathode). Gas diffusion layers (GDL) are used to deliver the reactant fuels to the electrodes from bipolar plate microchannels.

In operation, a first fuel reactant, for example, hydrogen ($H_2$), is supplied to the anode via a hydrogen layer, and a second fuel reactant, for example, oxygen ($O_2$) is supplied to the cathode via an air layer. Hydrogen and air enter the FC stack and mix within the reaction region of the MEA and flow through microchannels formed in the hydrogen layer and the air layer to produce electricity, with water and heat as reaction byproducts. Additionally, coolant also enters and exits the FC stack and flows outside of the reaction zones within coolant microchannels defined by the opposite sides of the hydrogen plate and the air plate.

Due to the discrete nature of the microchannels, a majority of the coolant layer can be blocked due to direct contact between the hydrogen plate and the air plate. For example, when a hydrogen channel is vertically aligned with an air channel, the coolant layer can be blocked at this location. This may, in turn, reduce the coolant flow within the coolant layer, which adversely effects the performance of the FC. In some regions, however, the coolant microchannels are very narrow or completely blocked, while in other regions the coolant microchannels are wide and open. This may lead to non-uniform thermal management throughout the FC stack, and consequently, inefficient FC stack performance.

BRIEF SUMMARY

In accordance with one or more embodiments, a permeable support infill structure strategically positioned in an interstitial space between an air plate and a hydrogen plate to prevent flow blockage at the coolant layer, particularly in regions where there is direct contact between the air plate and the hydrogen plate.

The permeable support infill structure is configured to facilitate a clear path for coolant flow within the coolant layer by ensuring spacing or a gap between the air layer and the hydrogen layer, while also permitting coolant flow through the permeable support infill structure. This provides more uniform thermal management throughout the FC stack, and particularly, enhanced and consistent performance by the FC stack.

The permeable support infill structure can be composed of sintered metal powder particles exhibiting high thermal conductivity. The sintered metal powder is configured to facilitate coolant flow therethrough and define a thermally conductive path between the air layer and the hydrogen layer. In particular, the thermally conductive path may be provided between an actively cooled (e.g., a heat dissipating) region of a plate and a hot region (e.g., heat source) of another plate.

The permeable support infill structure can be composed of sintered ceramic powder particles exhibiting high thermal conductivity. The sintered metal powder particles are configured to facilitate coolant flow therethrough and define a thermally conductive path between the air layer and the hydrogen layer. In particular, the thermally conductive path may be provided between an actively cooled (e.g., a heat dissipating) region of a plate and a hot region (e.g., heat source) of another plate.

The metal powder particles and ceramic powder particles may be single sized or multi-sized to create mono-porous or bi-porous cooling structures. Additionally, the metal powder particles and ceramic powder particles may be sized to provide a graded porosity through the coolant layer.

In accordance with one or more embodiments, a fuel cell may comprise one or more of the following: a first fuel cell bipolar plate defining an air layer; a second fuel cell bipolar plate defining a hydrogen layer; a coolant layer, defined by the air layer and the hydrogen layer, having a plurality of coolant microchannels that facilitate flow of a coolant therethrough; and a permeable support infill structure, composed of sintered thermally conductive powder particles, arranged at the cooling layer to prevent flow blockage at the coolant layer, define a thermally conductive path between the air layer and the hydrogen layer, and facilitate coolant flow through the permeable support infill structure.

In accordance with one or more embodiments, a fuel cell may comprise one or more of the following: a multi-layer structure that includes: a first fuel cell bipolar plate defining an air layer, a second fuel cell bipolar plate defining a hydrogen layer, a coolant layer defined by stacking the air layer and the hydrogen layer, and a permeable support infill structure, composed of sintered thermally conductive powder particles, configured to prevent flow blockage at the coolant layer, define a thermally conductive path between the air layer and the hydrogen layer, and facilitate coolant flow through the permeable support infill structure.

In accordance with one or more embodiments a method of fabricating a fuel cell may comprise one or more of the following: stacking a first fuel cell bipolar plate defining an air layer and a second fuel cell bipolar plate defining a hydrogen layer at a fixed distance from one another to define a coolant layer; filling the coolant layer with metal powder particles; and sintering the metal powder particles to form a permeable, thermally conductive support infill structure configured to prevent flow blockage at the coolant layer, define a thermally conductive path between the air layer and the hydrogen layer, and facilitate coolant flow through the permeable support infill structure.

In accordance with one or more embodiments a method of fabricating a fuel cell may comprise one or more of the following: stacking a first fuel cell bipolar plate defining an air layer and a second fuel cell bipolar plate defining a hydrogen layer at a fixed distance from one another to define a coolant layer; filling the coolant layer with thermally conductive ceramic powder particles; and sintering the thermally conductive ceramic powder particles to form a permeable, thermally conductive support infill structure configured to prevent flow blockage at the coolant layer, define a thermally conductive path between the air layer and the hydrogen layer, and facilitate coolant flow through the permeable support infill structure.

In accordance with one or more embodiments a method of fabricating a fuel cell may comprise one or more of the following: stacking a first fuel cell bipolar plate defining an air layer and a second fuel cell bipolar plate defining a hydrogen layer at a fixed distance from one another to define a coolant layer; filling the coolant layer with single-sized, thermally conductive powder particles composed of a metal or a ceramic; and sintering the single-sized, thermally conductive powder particles to form a monoporous, thermally conductive support infill structure configured to prevent flow blockage at the coolant layer, define a thermally conductive path between the air layer and the hydrogen layer, and facilitate coolant flow through the permeable support infill structure.

In accordance with one or more embodiments a method of fabricating a fuel cell may comprise one or more of the following: stacking a first fuel cell bipolar plate defining an air layer and a second fuel cell bipolar plate defining a hydrogen layer at a fixed distance from one another to define a coolant layer; filling the coolant layer with multi-sized, thermally conductive powder particles composed of a metal or a ceramic; and sintering the multi-sized, thermally conductive powder particles to form a monoporous, thermally conductive support infill structure configured to prevent flow blockage at the coolant layer, define a thermally conductive path between the air layer and the hydrogen layer, and facilitate coolant flow through the permeable support infill structure.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
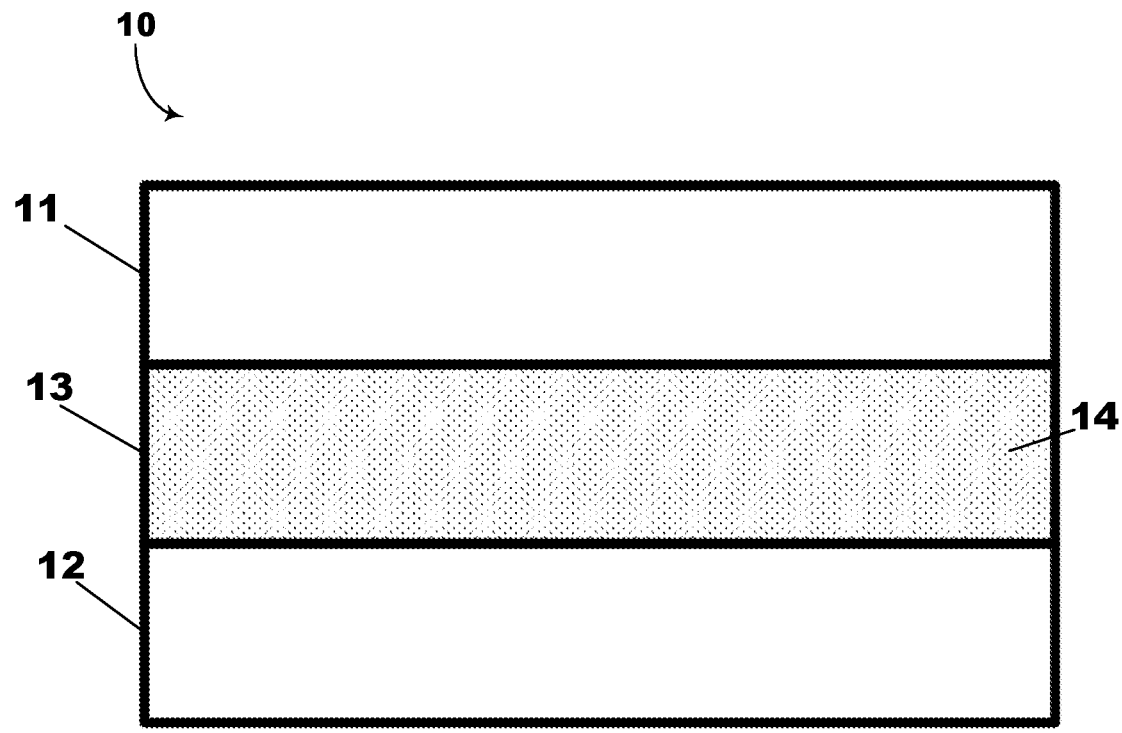
FIG. 1 illustrates an example multi-layered fuel cell, in accordance with one or more embodiments shown and described herein.
Figure 2:
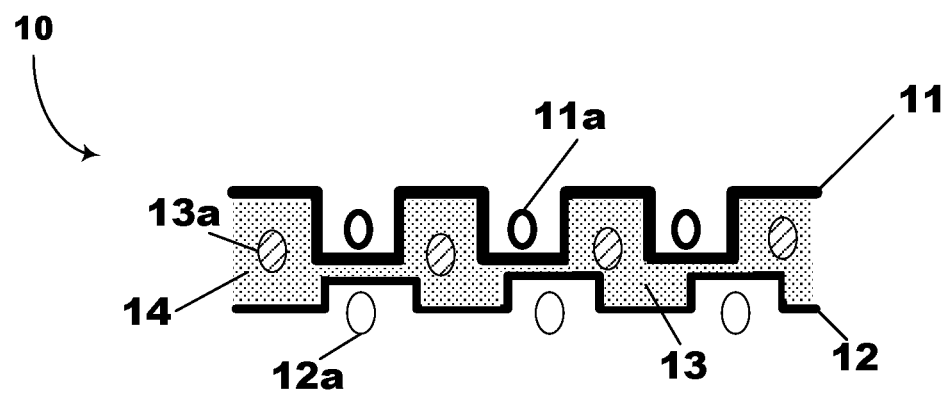
FIG. 2 illustrates a cross-sectional view of an example multi-layered fluid flow network of a fuel cell, in accordance with one or more embodiments shown and described herein.

As illustrated in FIGS. 1 and 2, a fuel cell 10 comprises a first bipolar plate defining an air layer 11, a second bipolar plate defining a hydrogen layer 12. The air layer 11 comprises a plurality of independently formed air fluid flow network or microchannels 11a, and the hydrogen layer 12 comprises a plurality of independently formed hydrogen fluid flow network or microchannels 12a. Through the superimposition or stacking of the air plate 11 and the hydrogen plate 12, a coolant layer 13 comprising a plurality of coolant flow network or microchannels 13a is defined. In this way, the coolant fluid flow network or microchannel configuration 13a is dependent upon the independently-formed air microchannels 11a and hydrogen microchannels 12a.

In accordance with one or more embodiments, to prevent blockage in the coolant microchannels 13a, particularly in regions or interfaces where there is direct contact between the air plate 11 and the hydrogen plate 12, a permeable layer 14 composed of sintered thermally conductive powder particles is disposed between the air plate 11 and the hydrogen plate 12 to facilitate coolant flow in the coolant microchannels 13a.

In accordance with one or more embodiments, the permeable support infill structure 14 may be composed of sintered metal powder particles. Such metal powder particles should exhibit high thermal conductivity. Such a structural configuration would enhance the overall thermal management of the FC. The permeable support infill structure 14 may be configured to define a thermally conductive path between the air plate 11 and the hydrogen plate 12. Such a structural configuration would enhance the overall thermal management of the FC, which, in turn, results in enhanced and consistent performance by the FC stack.

In accordance with one or more embodiments, the permeable support infill structure 14 may be composed of sintered ceramic powder particles to facilitate flow of coolant therethrough. Such ceramic powder particles should exhibit high thermal conductivity, such as, for example, alumina. Such a structural configuration would enhance the overall thermal management of the FC, which, in turn, results in enhanced and consistent performance by the FC stack.

In accordance with one or more embodiments, the permeable support infill structure 14, composed of sintered metal or ceramic powder particles connected to the air plate 11 and the hydrogen plate 12, ensures existence of a gap between the air plate 11 and the hydrogen plate 12.

In accordance with one or more embodiments, the permeability of the sintered metal or ceramic powder particles is customized and graded across the permeable support infill structure 14 to provide optimized fluid flow through the coolant layer 13.

FIGS. 3 to 6 illustrate flowcharts of methods 100, 200, 300, 400 for fabricating an FC, in accordance with embodiments. Each method 100, 200, 300, 400 is to yield an optimized design of an FC having microchannel configurations that reduce the overall size of the FC. Moreover, each method 100, 200, 300, 400 is to yield an optimized design of a FC bipolar plate having enhanced operational performance by facilitating more uniform thermal management of the MEA at the cooling layer. Such uniform thermal management, in turn, facilitates more uniform reactions at the MEA that in turn, maximizes the generation of electricity by the FC stack.

The flowchart of each respective method 100, 200, 300, 400 corresponds to the schematic illustrations of FIGS. 1 and 2 which are set forth and described herein. In accordance with embodiments, each method 100, 200, 300, 400 may be implemented, for example, using logic instructions (e.g., software), configurable logic, fixed-functionality hardware logic, etc., or any combination thereof. As an example, software executed on one or more computer systems may provide functionality described or illustrated herein. Each computing system respectively includes one or more processors. In particular, software executing on one or more computer systems may perform one or more fabrication or processing blocks of each method 100, 200, 300, 400 described or illustrated herein or provides functionality described or illustrated herein.

Figure 3:
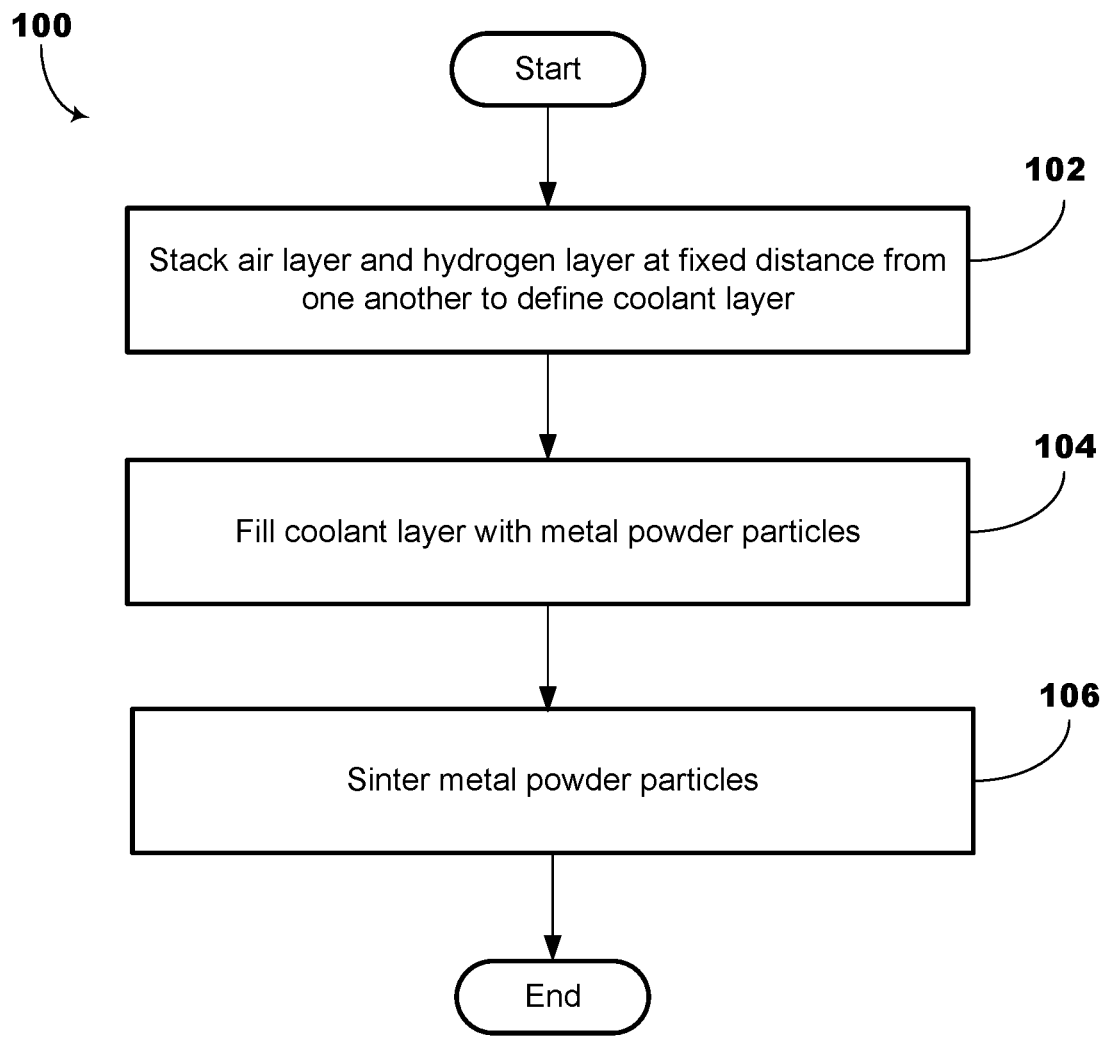
FIGS. 3 to 6 illustrate a schematic diagram of example methods of fabricating an FC, in accordance with one or more embodiments shown and described herein.

As illustrated in FIG. 3, in the method 100, illustrated processing block 102 includes stacking a first fuel cell bipolar plate defining an air layer and a second fuel cell bipolar plate defining a hydrogen layer at a fixed distance from one another to define a coolant layer.

The method 100 may then proceed to illustrated process block 104, which includes filling the coolant layer with metal powder particles.

The method 100 may then proceed to illustrated process block 106, which includes sintering the metal powder particles to form a permeable, thermally conductive support infill structure configured to prevent flow blockage at the coolant layer, define a thermally conductive path between the air layer and the hydrogen layer, and facilitate coolant flow through the permeable support infill structure.

The method 100 can then terminate or end after completion of process block 106.

Figure 4:
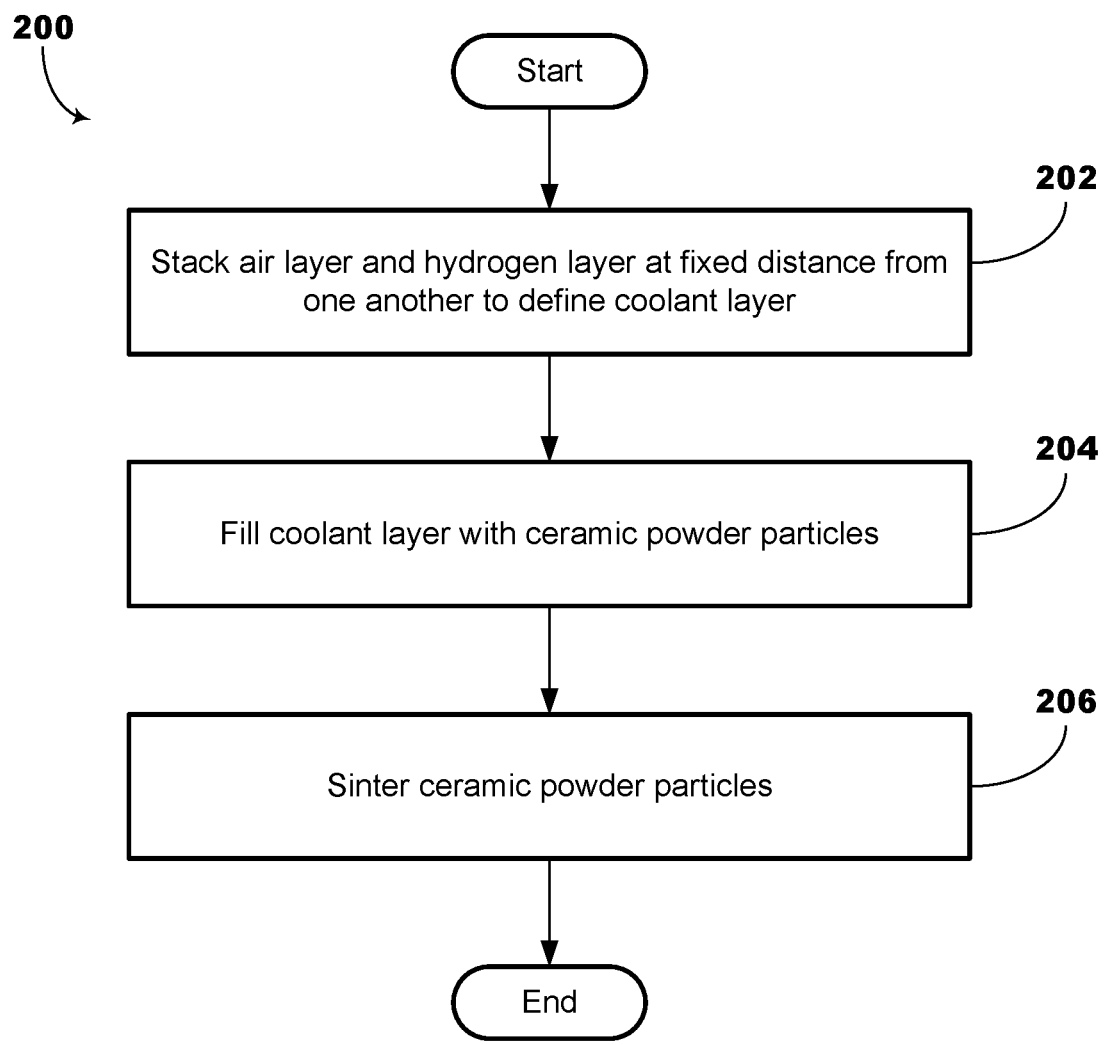

As illustrated in FIG. 4, in the method 200, illustrated processing block 202 includes stacking a first fuel cell bipolar plate defining an air layer and a second fuel cell bipolar plate defining a hydrogen layer at a fixed distance from one another to define a coolant layer.

The method 200 may then proceed to illustrated process block 204, which includes filling the coolant layer with thermally conductive ceramic powder particles.

The method 200 may then proceed to illustrated process block 206, which includes sintering the thermally conductive ceramic powder particles to form a permeable, thermally conductive support infill structure configured to prevent flow blockage at the coolant layer, define a thermally conductive path between the air layer and the hydrogen layer, and facilitate coolant flow through the permeable support infill structure.

The method 200 can then terminate or end after completion of process block 206.

Figure 5:
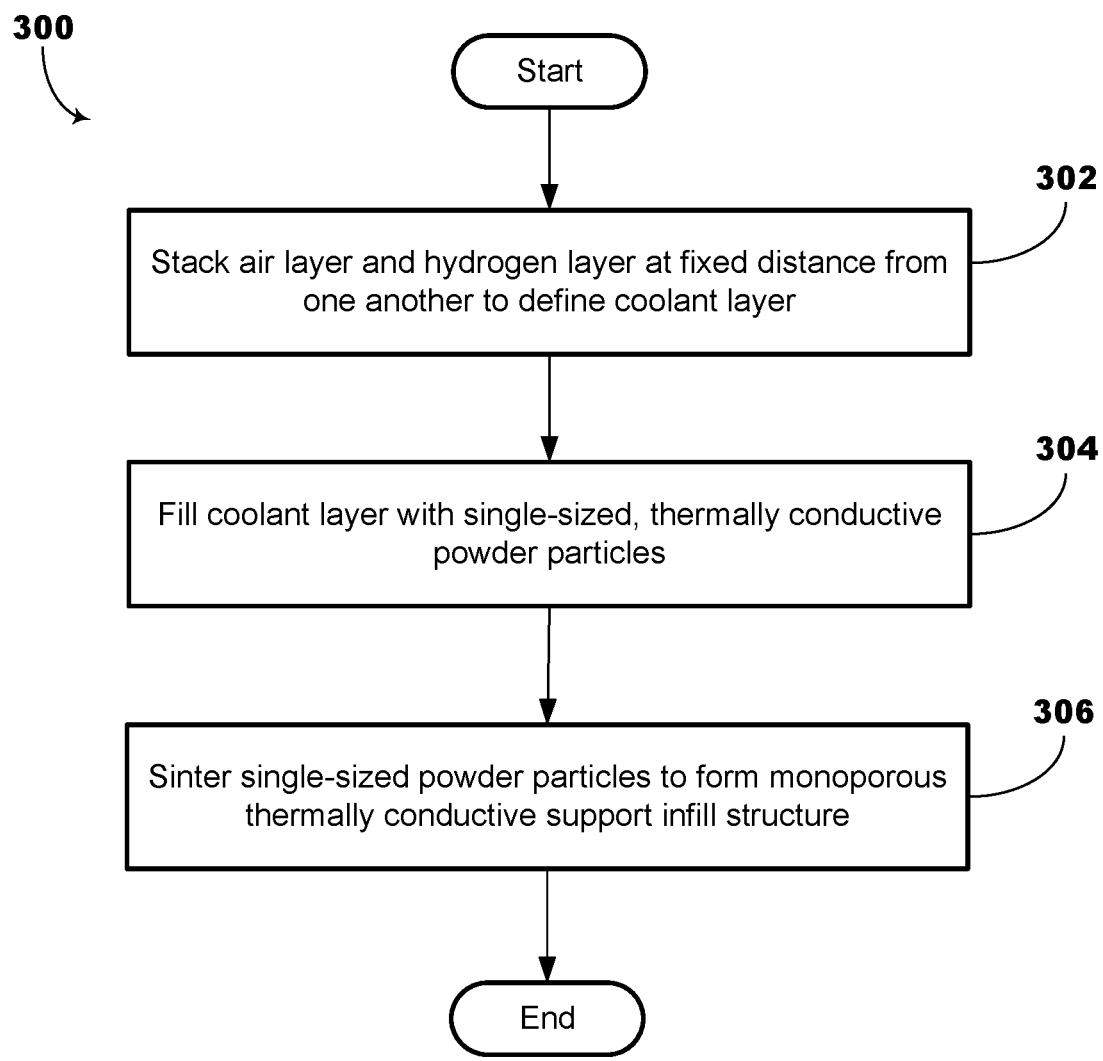

As illustrated in FIG. 5, in the method 300, illustrated processing block 302 includes stacking a first fuel cell bipolar plate defining an air layer and a second fuel cell bipolar plate defining a hydrogen layer at a fixed distance from one another to define a coolant layer.

The method 300 may then proceed to illustrated process block 304, which includes filling the coolant layer with single-sized, thermally conductive powder particles composed of a metal or a ceramic.

The method 300 may then proceed to illustrated process block 306, which includes sintering the single-sized, thermally conductive powder particles to form a monoporous, thermally conductive support infill structure configured to prevent flow blockage at the coolant layer, define a thermally conductive path between the air layer and the hydrogen layer, and facilitate coolant flow through the permeable support infill structure.

The method 300 can then terminate or end after completion of process block 306.

Figure 6:
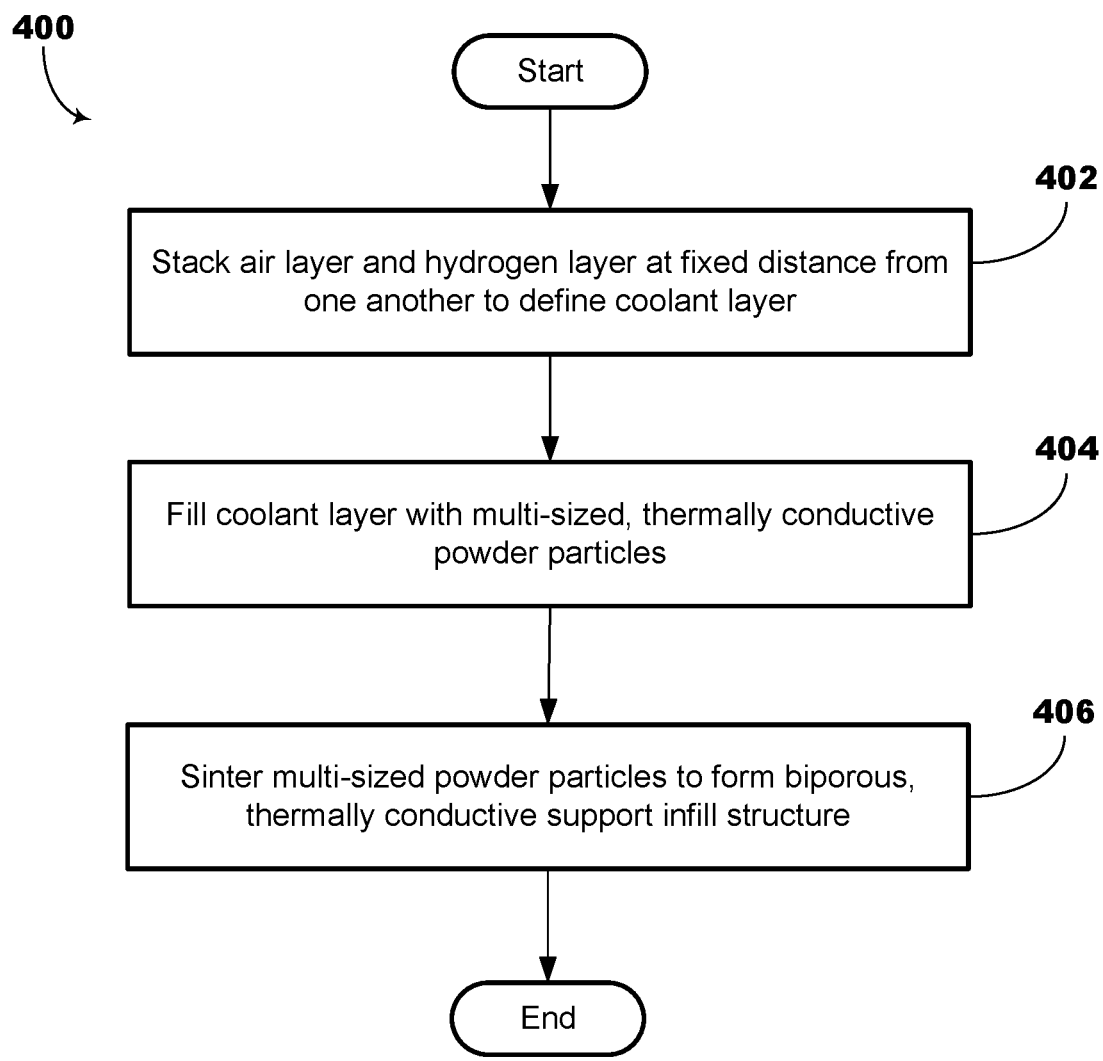

As illustrated in FIG. 6, in the method 400, illustrated processing block 402 includes stacking a first fuel cell bipolar plate defining an air layer and a second fuel cell bipolar plate defining a hydrogen layer at a fixed distance from one another to define a coolant layer.

The method 400 may then proceed to illustrated process block 404, which includes filling the coolant layer with multi-sized, thermally conductive powder particles composed of a metal or a ceramic.

The method 400 may then proceed to illustrated process block 406, which includes sintering the multi-sized, thermally conductive powder particles to form a monoporous, thermally conductive support infill structure configured to prevent flow blockage at the coolant layer, define a thermally conductive path between the air layer and the hydrogen layer, and facilitate coolant flow through the permeable support infill structure.

The method 400 can then terminate or end after completion of process block 406.

The terms "coupled," "attached," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A fuel cell, comprising:
    a first fuel cell bipolar plate defining an air layer;
    a second fuel cell bipolar plate defining a hydrogen layer;
    a coolant layer, defined by the air layer and the hydrogen layer, having a plurality of coolant microchannels that facilitate flow of a coolant therethrough; and
    a permeable support infill structure, composed of sintered thermally conductive powder particles, arranged at the coolant layer to prevent flow blockage at the coolant layer through the plurality of coolant microchannels, define a thermally conductive path between the air layer and the hydrogen layer, and facilitate coolant flow through the plurality of coolant microchannels in the permeable support infill structure, wherein the permeable support infill structure is distinct from the plurality of coolant microchannels.

2. The fuel cell of claim 1, wherein the sintered thermally conductive powder particles comprise metal powder particles.

3. The fuel cell of claim 1, wherein the sintered thermally conductive powder particles comprise single-sized metal powder particles.

4. The fuel cell of claim 1, wherein the sintered thermally conductive powder particles comprise multi-sized metal powder particles.

5. The fuel cell of claim 1, wherein the sintered thermally conductive powder particles comprise ceramic powder particles.

6. The fuel cell of claim 1, wherein the sintered thermally conductive powder particles comprise single-sized ceramic powder particles.

7. The fuel cell of claim 1, wherein the sintered thermally conductive powder particles comprise multi-sized ceramic powder particles.

8. A fuel cell, comprising:
    a multi-layer structure that includes:
    a first fuel cell bipolar plate defining an air layer,
    a second fuel cell bipolar plate defining a hydrogen layer,
    a coolant layer defined by stacking the air layer and the hydrogen layer, having a plurality of coolant microchannels that facilitate flow of a coolant therethrough and
a permeable support infill structure, composed of sintered thermally conductive powder particles, configured to prevent flow blockage at the coolant layer through the plurality of coolant microchannels, define a thermally conductive path between the air layer and the hydrogen layer, and facilitate the coolant flow through the plurality of coolant microchannels in the permeable support infill structure, wherein the permeable support infill structure is distinct from the plurality of coolant microchannels.

9. The fuel cell of claim 8, wherein the sintered thermally conductive powder particles comprise metal powder particles.

10. The fuel cell of claim 8, wherein the sintered thermally conductive powder particles comprise single-sized metal powder particles.

11. The fuel cell of claim 8, wherein the sintered thermally conductive powder particles comprise multi-sized metal powder particles.

12. The fuel cell of claim 8, wherein the sintered thermally conductive powder particles comprise ceramic powder particles.

13. The fuel cell of claim 8, wherein the sintered thermally conductive powder particles comprise single-sized ceramic powder particles.

14. The fuel cell of claim 8, wherein the sintered thermally conductive powder particles comprise multi-sized ceramic powder particles.

15. A method of fabricating a fuel cell, the method comprising:
stacking a first fuel cell bipolar plate defining an air layer and a second fuel cell bipolar plate defining a hydrogen layer at a fixed distance from one another to define a coolant layer;
filling the coolant layer with thermally conductive powder particles; and
sintering the thermally conductive powder particles to form a permeable support infill structure configured to prevent flow blockage at the coolant layer through a plurality of coolant microchannels in the coolant layer, define a thermally conductive path between the air layer and the hydrogen layer, and facilitate coolant flow through the plurality of coolant microchannels in the permeable support infill structure, wherein the permeable support infill structure is distinct from the plurality of coolant microchannels.

16. The method of claim 15, wherein the sintered thermally conductive powder particles comprise metal powder particles or ceramic powder particles.

17. The method of claim 16, wherein the metal powder particles comprise single-sized metal powder particles.

18. The method of claim 16, wherein the metal powder particles comprise multi-sized metal powder particles.

19. The method of claim 16, wherein the ceramic powder particles comprise single-sized ceramic powder particles.

20. The method of claim 16, wherein the ceramic powder particles comprise multi-sized ceramic powder particles.

* * * * *